(12) United States Patent
Boeckstiegel et al.

(10) Patent No.: US 6,532,800 B1
(45) Date of Patent: Mar. 18, 2003

(54) AIRCRAFT PRESSURIZATION TEST APPARATUS AND METHOD OF USING SAME

(75) Inventors: Donald Boeckstiegel, Afton, MO (US); Scott Ritchie, Manchester, MO (US); William D. Ousley, St. Louis, MO (US)

(73) Assignee: Thunder Aviation NA, Inc., Chesterfield, MO (US)

( * ) Notice: Subject to any disclaimer, the term of this patent is extended or adjusted under 35 U.S.C. 154(b) by 0 days.

(21) Appl. No.: 10/123,638

(22) Filed: Apr. 16, 2002

(51) Int. Cl.$^7$ .............................. G01M 3/08
(52) U.S. Cl. .................................. 73/40.5
(58) Field of Search ................. 73/1.78, 49.2, 73/49.3, 40.5 R, 52, 170.02, 714; 244/1 R, 2, 117 R, 119, 120

(56) References Cited

U.S. PATENT DOCUMENTS

| | | | |
|---|---|---|---|
| 3,893,332 A | | 7/1975 | Dolan et al. |
| 3,918,291 A | | 11/1975 | Pauly et al. |
| 4,363,236 A | | 12/1982 | Meyers |
| 4,449,393 A | | 5/1984 | Tucker et al. |
| 4,510,791 A | | 4/1985 | Yuill |
| 4,553,474 A | * | 11/1985 | Wong et al. .......... 454/71 |
| H000034 H | * | 3/1986 | Werling .......... 73/40.5 R |
| 5,083,451 A | | 1/1992 | Kling |
| 5,367,797 A | | 11/1994 | Zaim |
| 5,925,816 A | | 7/1999 | Kovacs |

FOREIGN PATENT DOCUMENTS

FR      2696828 A1    10/1992

* cited by examiner

Primary Examiner—William Oen
(74) Attorney, Agent, or Firm—Thompson Coburn, LLP

(57) ABSTRACT

A method of using an aircraft pressurization test apparatus to perform diagnostic tests on an aircraft while the aircraft is at a first region of a ground site, such as an aircraft hanger. The method comprises: positioning the aircraft at the first region of the ground site, using a first delivery line in a manner to enable fluid communication between a shop air aperture of the aircraft pressurization test apparatus and an air coupler of a shop air system at the ground site; using a second delivery line in a manner to enable fluid communication between an aircraft cabin pressurization inlet opening of the aircraft and a delivery air aperture of the aircraft pressurization test apparatus; delivering air from a compressor of the shop air system through the aircraft cabin pressurization inlet opening and into the aircraft cabin via the shop air aperture and the delivery air aperture of the aircraft pressurization test apparatus; and regulating the delivery of air from the compressor of the shop air system through the aircraft cabin pressurization inlet opening by changing characteristics of the flow path between the shop air aperture and the delivery air aperture.

26 Claims, 3 Drawing Sheets

AIRCRAFT PRESSURIZATION TEST APPARATUS AND METHOD OF USING SAME

BACKGROUND OF THE INVENTION

This invention relates to aircraft pressurization test apparatus and method of using such apparatus to perform pressure-related diagnostic tests on aircraft.

A conventional aircraft pressurization test unit includes several measurement components for performing pressure-related diagnostics and an integral blower to pressurize the aircraft cabin. The blower of the test unit is noisy and the noise affects a user's ability to detect air leaks of the aircraft cabin. Also, the air delivered by the test unit to the aircraft cabin is hot. The hot air makes the aircraft cabin uncomfortably hot for people performing tests in the cabin.

SUMMARY OF THE INVENTION

Among the several advantages of the present invention may be noted the provision of an improved aircraft pressurization test apparatus which is sufficiently quiet so as to not substantially interfere in a user's ability to perform pressure-related diagnostics on an aircraft cabin; such an aircraft pressurization test apparatus adapted for delivering cool air to an aircraft cabin; and a method of using an aircraft pressurization test apparatus to perform pressure-related diagnostics on an aircraft cabin which provides improved results.

Generally, a method of the present invention is of using an aircraft pressurization test apparatus to perform diagnostic tests on an aircraft while the aircraft is at a first region of a ground site, such as an aircraft hanger. The ground site includes shop air. The shop air comprises a compressor fixedly secured to a second region of the ground site. The shop air further comprises fluid lines and a plurality of air couplers at different locations of the ground site. The compressor and fluid lines are configured and adapted for delivery of pressurized air to the air couplers. The aircraft comprises an aircraft cabin and an aircraft cabin pressurization inlet opening in fluid communication with the aircraft cabin. The aircraft pressurization test apparatus comprises a shop air aperture and a delivery air aperture. The method comprises: positioning the aircraft at the first region of the ground site, using a first delivery line in a manner to enable fluid communication between the shop air aperture of the aircraft pressurization test apparatus and one of the air couplers of the shop air; using a second delivery line in a manner to enable fluid communication between the aircraft cabin pressurization inlet opening and the delivery air aperture; delivering air from the compressor of the shop air through the aircraft cabin pressurization inlet opening and into the aircraft cabin via the shop air aperture and the delivery air aperture of the aircraft pressurization test apparatus; and regulating the delivery of air from the compressor of the shop air through the aircraft cabin pressurization inlet opening by changing characteristics of the flow path between the shop air aperture and the delivery air aperture.

Another aspect of the present invention is a method of using an aircraft pressurization test apparatus to detect air leakage from a cabin of an aircraft. The aircraft comprises the aircraft cabin and an aircraft cabin pressurization inlet opening in fluid communication with the aircraft cabin. The aircraft pressurization test apparatus comprises a source air aperture and a delivery air aperture. The method comprises positioning the aircraft at a first region of a ground site. The ground site further includes a second region with a source of pressurized air at the second region. The method further comprises: using a first delivery line in a manner to enable fluid communication between the source air aperture of the aircraft pressurization test apparatus and the source of pressurized air; using a second delivery line in a manner to enable fluid communication between the aircraft cabin pressurization inlet opening and the delivery air aperture; delivering air from the source of pressurized air through the aircraft cabin pressurization inlet opening and into the aircraft cabin via the source air aperture and the delivery air aperture of the aircraft pressurization test apparatus; and listening to the exterior of the aircraft for leakage of air from the aircraft cabin to locate leaks. The delivering of air is sufficient to pressurize the aircraft cabin to a cabin test pressure. The step of positioning the aircraft at the first region of the ground site comprises positioning the aircraft sufficiently remote from the source of pressurized air such that noise from the source of pressurized air is insufficient to interfere with the step of locating leaks.

Another aspect of the present invention is a method of using an aircraft pressurization test apparatus to perform diagnostic tests on an aircraft while the aircraft is at a ground site, such as an aircraft hanger. The ground site includes a source of pressurized air. The aircraft comprises an aircraft cabin and an aircraft cabin pressurization inlet opening in fluid communication with the aircraft cabin. The aircraft pressurization test apparatus comprises a source air aperture and a delivery air aperture. The method comprises: positioning the aircraft at the ground site; using a first delivery line in a manner to enable fluid communication between the source air aperture of the aircraft pressurization test apparatus and the source of pressurized air; using a second delivery line in a manner to enable fluid communication between the aircraft cabin pressurization inlet opening and the delivery air aperture; delivering air from the source of pressurized air through the aircraft cabin pressurization inlet opening and into the aircraft cabin via the source air aperture and the delivery air aperture of the aircraft pressurization test apparatus, the delivering of air being sufficient to pressurize the aircraft cabin to a cabin test pressure; detecting leakage of air from the aircraft cabin; and maintaining delivery of air from the source of pressurized air and into the aircraft cabin at a temperature of less than 120° F. (49° C.) during the step of detecting leakage of air from the aircraft cabin.

Another aspect of the present invention is an aircraft cabin pressurization test apparatus for performing diagnostic tests on an aircraft while the aircraft is at a first region of a ground site, such as an aircraft hanger. The aircraft comprises an aircraft cabin. The ground site includes a source of pressurized air. The aircraft cabin pressurization test apparatus comprises a housing, a shop air coupler, a delivery air coupler, at least one valve, a supply air flow gauge, a supply air pressure gauge, a cabin feedback air coupler, and a cabin pressure gauge. The shop air coupler is connected to the housing and configured and adapted to releasably receive a fluid line in fluid communication with the source of pressurized air of the ground site. The delivery air coupler is connected to the housing and configured and adapted to releasably receive a fluid line in fluid communication with an aircraft cabin pressurization inlet opening of the aircraft. A supply air pathway is defined between the shop air coupler and the delivery air coupler. The valve is in the supply air pathway and is adapted for controlling flow of air from the shop air coupler through the delivery air coupler. The supply air flow gauge is adapted and configured for gauging air flow in the supply air pathway. The supply air pressure gauge is adapted and configured for gauging air pressure in the supply air pathway. The cabin feedback air coupler is connected to the housing and adapted and configured to releasably receive a fluid line in fluid communication with the aircraft cabin. The cabin pressure gauge is at least partially within the housing and in fluid communication with the cabin feedback air coupler. The cabin pressure gauge is adapted and configured to gauge air pressure in the aircraft cabin when the cabin feedback air coupler is in fluid communication with the aircraft cabin.

Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
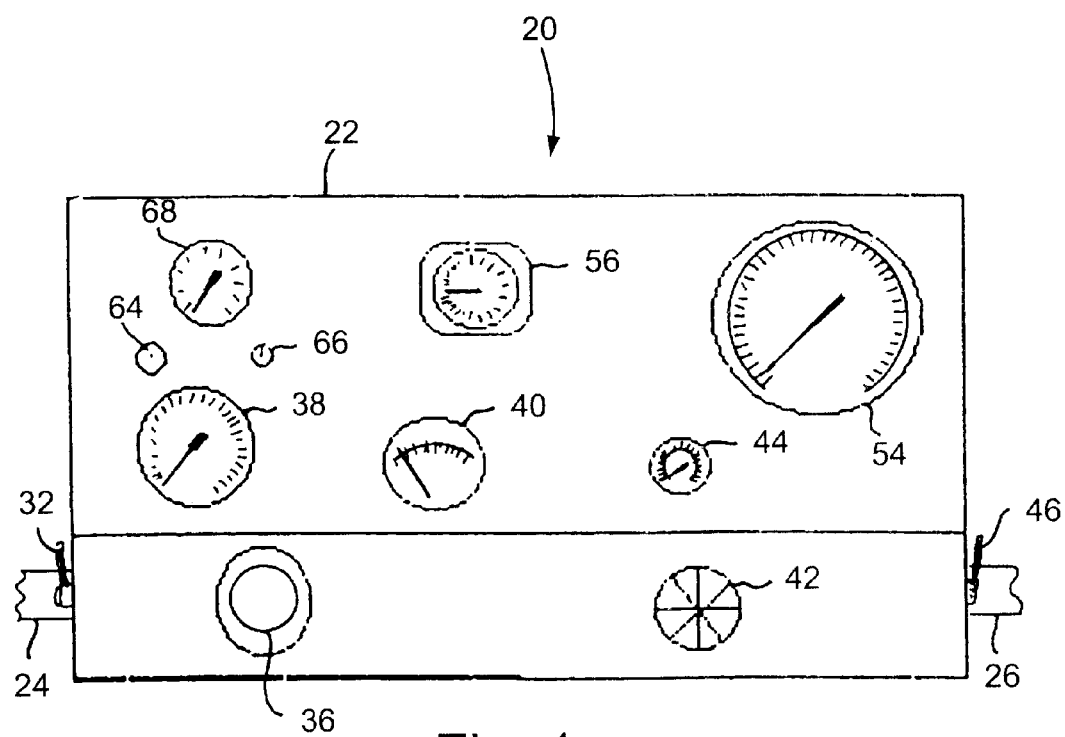
FIG. 1 is a front elevational view of an aircraft pressurization test apparatus of the present invention.

Referring now to the drawings and first more particularly to FIGS. 1–4, an aircraft pressurization test apparatus of the present invention is generally indicated by the reference numeral 20. The aircraft pressurization test apparatus 20 is adapted to perform pressure-related diagnostics on an aircraft cabin. As described in greater detail below, the aircraft pressurization test apparatus 20 may be employed to assist a user in detecting leakage of air from the aircraft cabin.

Figures 2, 3:
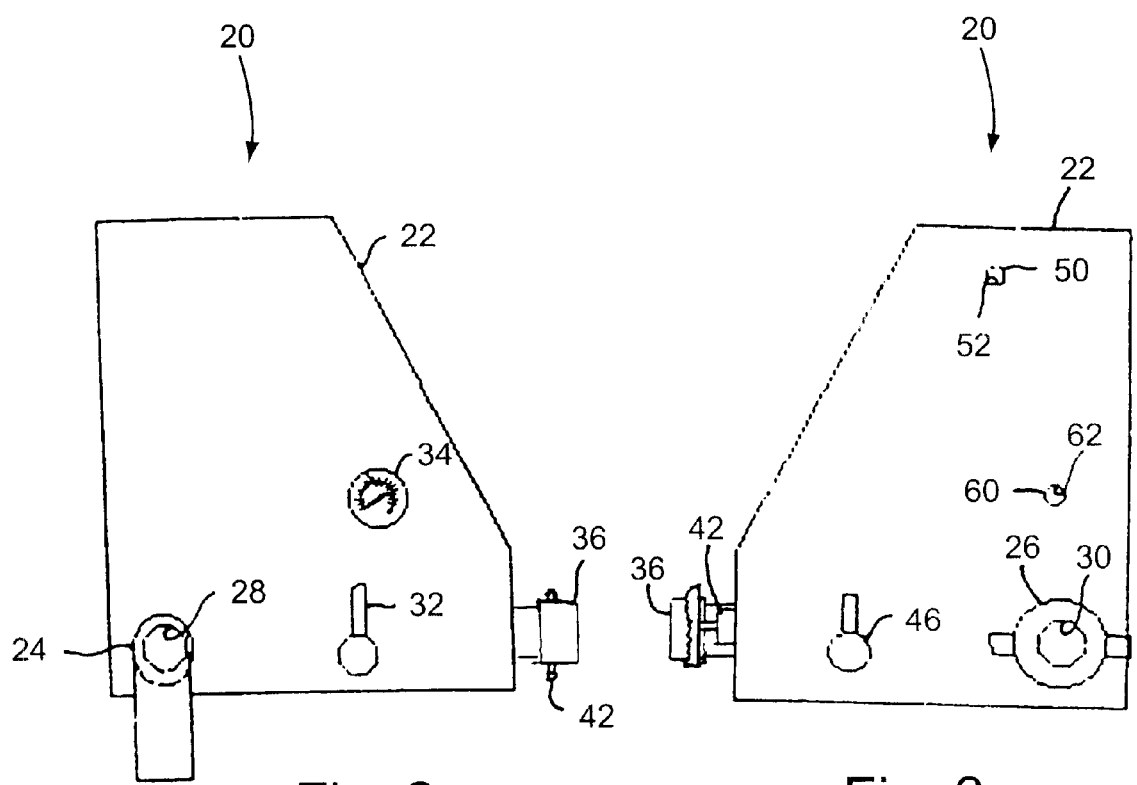
FIG. 2 is a left end elevational view of the aircraft pressurization test apparatus of FIG. 1.
FIG. 3 is a right end elevational view of the aircraft pressurization test apparatus of FIG. 1.
Figure 4:
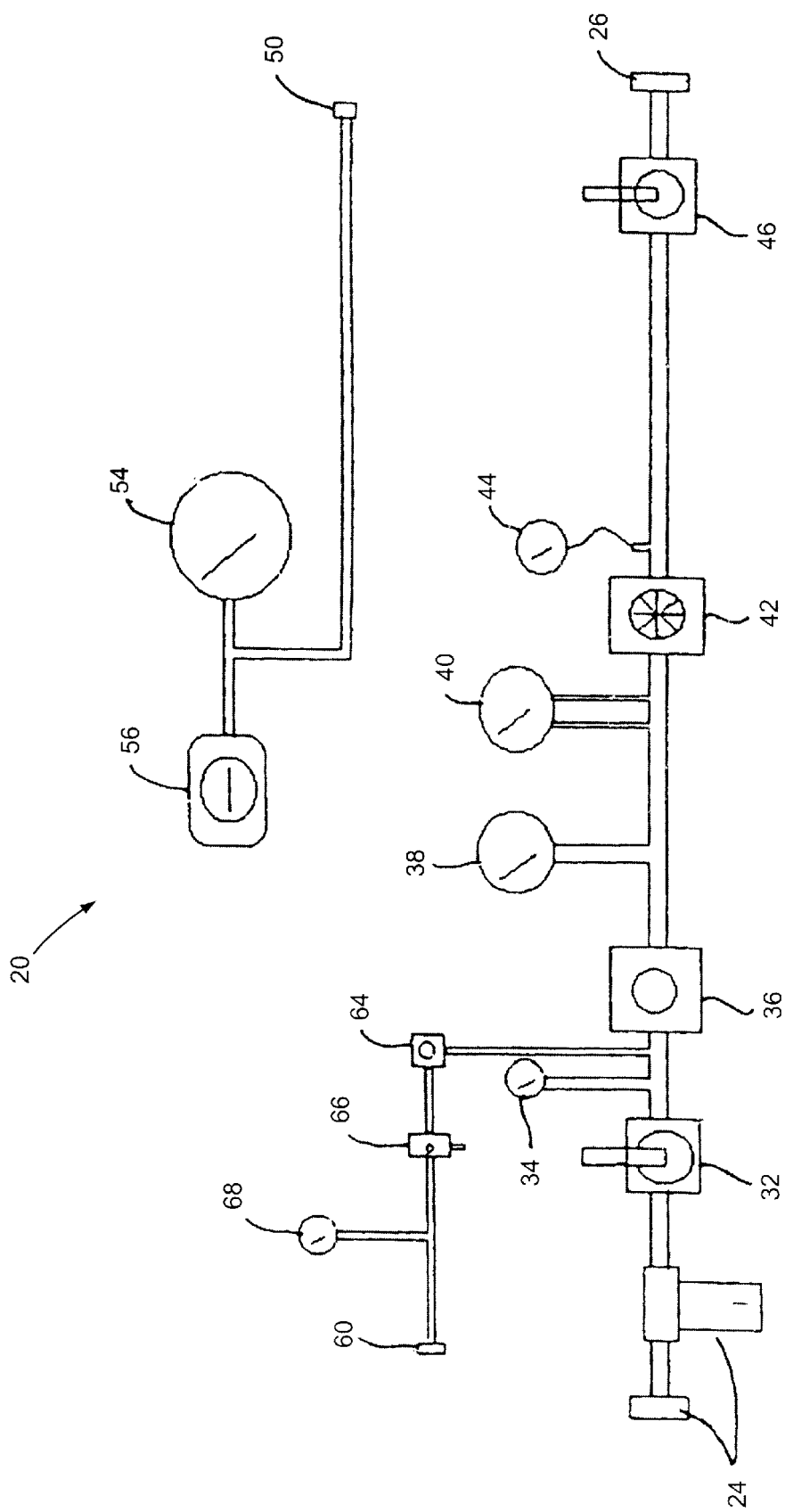
FIG. 4 is a schematic view of the aircraft pressurization test apparatus of FIG. 1.

The aircraft pressurization test apparatus 20 comprises a housing 22 (FIGS. 1–3), a shop air coupler 24 (FIGS. 2 and 4) and a delivery air coupler 26 (FIGS. 3 and 4). The shop air coupler 24 is preferably adjacent to and extends out of the housing 22 and includes a shop air aperture 28 (FIG. 2). The shop air coupler 24 is preferably a quick-release air coupler and is configured and adapted to releasably receive an air line in fluid communication with a source of pressurized air (discussed in greater detail below). The delivery air coupler 26 is preferably adjacent to and extends out of the housing 22 and includes a delivery air aperture 30 (FIG. 3). The delivery air coupler is preferably a quick-release air coupler and is configured and adapted to releasably receive an air line in fluid communication with an aircraft cabin (discussed in greater detail below). The aircraft pressurization test apparatus 20 includes a plurality of components defining a supply air pathway between the shop air aperture 28 and the delivery air aperture 30 for passage of air from the shop air aperture through the delivery air aperture.

As shown in FIG. 4, the aircraft pressurization test apparatus 20 further includes a supply air shut-off valve 32, a shop air pressure gauge 34, a supply pressure regulator valve 36, a supply air pressure gauge 38, a delivery air flow gauge 40, a flow control shut-off valve 42, a delivery air temperature gauge 44, and a delivery air shut-off valve 46. The supply air shut off valve 32 is preferably a lever-type ball valve adapted and configured to enable a user to quickly shut off air flow through the aircraft pressurization test apparatus 20 and air flow through the supply air pathway. The shop air pressure gauge 34 is configured and adapted for gauging the pressure of incoming air. The supply air regulator 36 regulates supply air pressure to the aircraft cabin. The supply air pressure gauge 38 indicates the pressure of regulated supply air. The delivery air flow gauge 40 is in communication with the delivery air aperture 26 and senses differential pressure along the supply air pathway. The delivery air flow gauge 40 is configured and adapted to gauge air flow through the delivery air aperture 26. The flow control shut-off valve 42 is preferably a gate valve and is used to check for proper operation of the supply air pressure regulator prior to applying air flow through the delivery air aperture 26 and to the aircraft cabin. The delivery air temperature gauge 44 gauges the temperature of air delivered through the delivery air aperture 26 and to the aircraft cabin. The delivery air temperature gauge 44 may be used for correcting actual air flow data (ACFM) to standard cubic feet per minute (SCFM) values. The delivery air shut off valve 46 is preferably a lever-type ball valve and is configured and adapted to prevent back flow of air through the aircraft pressurization test apparatus 20 when supply air is rapidly shut off by the supply air shut off valve 32. Preferably, each of the shop air pressure gauge 34, supply air pressure gauge 38, delivery air flow gauge 40, and delivery air temperature gauge 44 is at least partially within the housing 22 but has an externally readable display. Preferably, each of the flow control shut-off valve 42, delivery air shut-off valve 46, supply air shut-off valve 32, and supply pressure regulator valve 36 is partially within the housing but has a portion (e.g., a knob or lever) extending from the housing to operate the valve.

The aircraft cabin pressurization test apparatus 20 further comprises a cabin feedback air coupler 50 (FIGS. 3 and 4). The cabin feedback air coupler 50 is preferably adjacent to and extends out of the housing 22 and includes a cabin feedback air aperture 52 (FIG. 3). The cabin feedback air coupler 50 is preferably a quick-release air coupler and is configured and adapted to releasably receive an air line in fluid communication with an aircraft cabin (discussed in greater detail below). Referring to FIGS. 2 and 4, the aircraft cabin pressurization test apparatus 20 further comprises a cabin pressure gauge 54 and a cabin vertical speed indicator 56. Preferably, each of the cabin pressure gauge 54 and cabin vertical speed indicator 56 is at least partially within the housing 22 but has an externally readable display. The cabin pressure gauge 54 is in fluid communication with the cabin feedback air aperture 52 and is adapted and configured to gauge air pressure in the aircraft cabin when the cabin feedback air aperture is in fluid communication with the aircraft cabin. The cabin vertical speed indicator 56 is in fluid communication with the cabin feedback air aperture 52 of the cabin feedback air coupler 50 and is adapted and configured for indicating rate of change of air pressure.

The aircraft cabin pressurization test apparatus 20 further comprises a door seal output air coupler 60 (FIGS. 3 and 4). The door seal output air coupler 60 is preferably adjacent to and extends out of the housing 22 and includes a door seal output air aperture 62 (FIG. 3). The door seal output air coupler 60 is preferably a quick-release air coupler and is configured and adapted to releasably receive an air line in fluid communication with a door seal of an aircraft (discussed in greater detail below). A door seal air pathway is defined between the shop air aperture 28 and the door seal pressure output air aperture 62. The aircraft cabin pressurization test apparatus 20 further includes a door seal regulator valve 64, a close door seal vent valve 66, and a door seal pressure gauge 68. The door seal regulator valve 64 regulates pressure of air supply to an aircraft cabin door seal system. The close door seal vent valve 66 is adapted and configured for venting of the door seal pressure circuit once supply pressure has been turned off. The door seal pressure gauge indicates pressure of air supply to the aircraft cabin door seal system.

Figure 5:
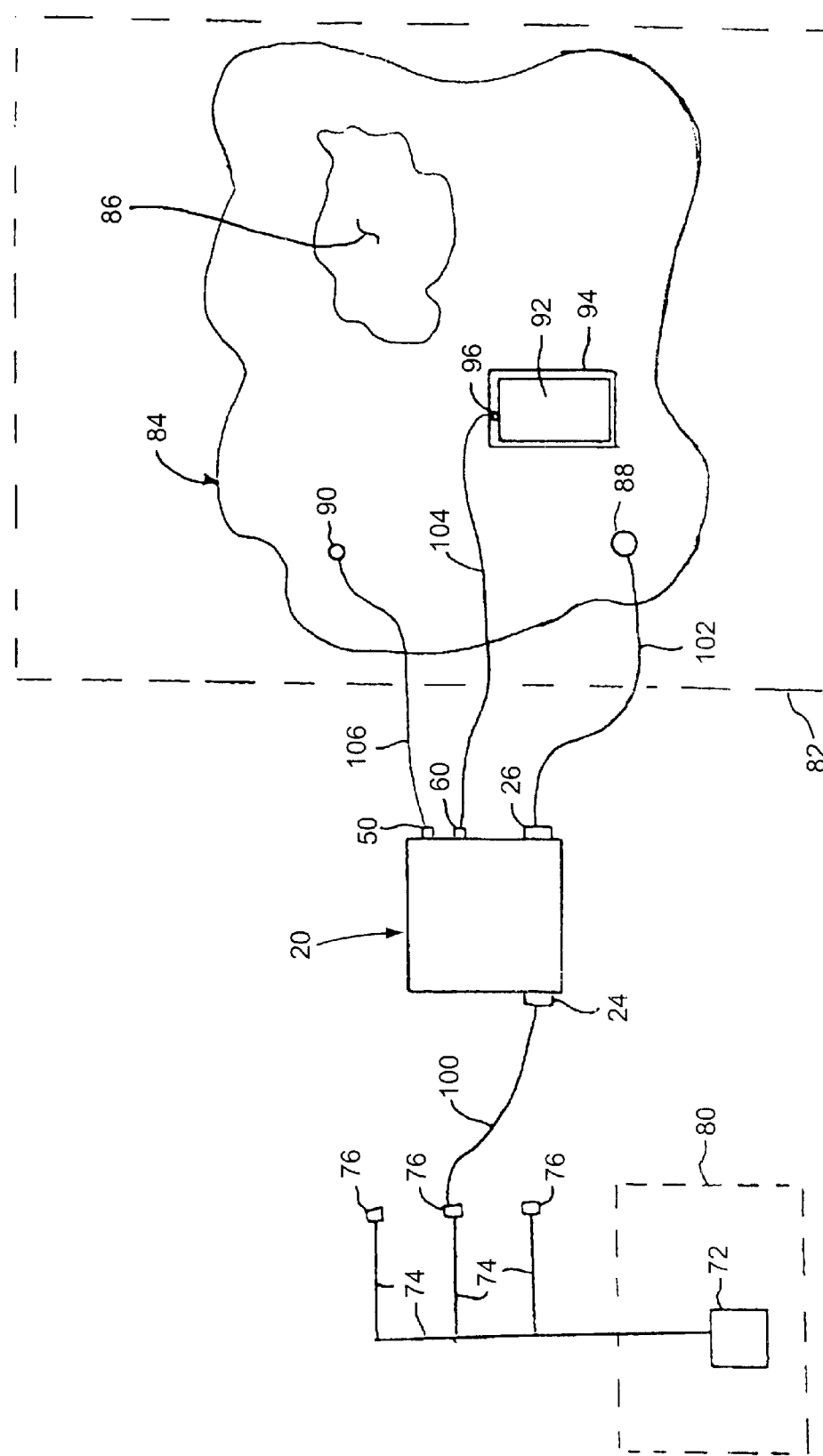
FIG. 5 is a schematic view of the aircraft pressurization test apparatus of FIG. 1 connected to a source of pressurized air and connected to an aircraft, the aircraft being shown schematically, fragmented and with portions broken away to show an aircraft cabin.

FIG. 5 is a schematic view of the aircraft pressurization test apparatus 20 connected to an aircraft cabin and connected to a source of pressurized air at a ground site, such as an aircraft hanger. Preferably the source of pressurized air comprises a shop air system, generally indicated at 70. The shop air system comprises an air compressor 72, fluid lines 74 and a plurality of air couplers 76 adapted for connection to an air hose. The ground site comprises a first region 80 and a second region 82. Preferably, the first and second regions 80, 82 are separated from each other by at least one wall. Alternatively, the first and second regions 80, 82 are in a single room, but are sufficiently remote from one another that noise generated in the first region does not significantly affect hearing-related diagnostics performed in the second region. The first region 80 may constitute a compressor room. The second region 82 is preferably suitable for receive an aircraft, schematically indicated at 84. Preferably, the air compressor 72 is in the first region 80 of the ground site. Preferably, the aircraft 84 is in the second region of the ground site. Also preferably, the air couplers 76 are at different locations of the ground site. The aircraft 84 comprises an aircraft cabin 86, an aircraft cabin pressurization inlet opening 88 in fluid communication with the aircraft cabin, an aircraft cabin pressure sense fitting 90 in fluid communication with the aircraft cabin, an aircraft door 92 for providing access to the aircraft cabin, a door seal 94 adjacent the aircraft door and having an interior configured to be inflated, and a door seal inlet opening 96 in fluid communication with the interior of the door seal.

In operation, the aircraft cabin pressurization test apparatus 20 is first connected to the source of pressurized air and connected to the airplane 84. In particular, one end of a first delivery line 100 (e.g., a shop air high pressure hose) is connected to one of the air couplers 76 and the other end of the first delivery line is connected to the shop air coupler 24 to enable fluid communication between the air coupler and the shop air aperture 28. One end of a second delivery line 102 (e.g., a delivery air supply hose) is connected to the delivery air coupler 26 and the other end of the second delivery line is connected to the aircraft cabin pressurization inlet opening 88 to provide fluid communication between the delivery air aperture 30 and the aircraft cabin 86. One end of a door seal pressure line 104 is connected to the door seal output air coupler 60 of the aircraft cabin pressurization test apparatus 20 and the other end of the door seal pressure line is connected to the door seal inlet opening 96 to provide fluid communication between the door seal output air aperture 62 and the door seal inlet opening. One end of a cabin feedback sensor hose 106 is connected to the cabin feedback air coupler 50 of the aircraft cabin pressurization test apparatus and the other end is connected to aircraft cabin pressure sense fitting 90 to provide fluid communication between the cabin feedback air aperture 52 and the aircraft cabin 86. With the fluid lines (hoses) connected and with the supply air shut-off valve 32 closed, the supply pressure regulator valve 36 is closed, the flow control shut-off valve 42 is closed, the door seal regulator valve 64 is closed, and the door seal vent valve 66 is seated to prevent venting. While the shut off valve (not shown) of the shop air system is in a closed position, the supply air shut-off valve 32 is slowly opened and the user verifies that zero pressure is indicated on the shop air pressure gauge 34. The shut off valve of the shop air system is then slowly opened and the user verifies that pressure is indicated on the shop air pressure gauge 34. The supply pressure regulator valve 36 is then opened which should cause the pressure indicated by the supply air pressure gauge 38 to increase smoothly. The flow control shut-off valve 42 and the delivery shut-off valve 46 are opened. The foregoing constitutes the equipment set-up procedure.

After the equipment set-up procedure is performed, the aircraft cabin pressurization test apparatus 20 may be employed to determine aircraft leakage rates. Aircraft leakage rates may be determined in the following manner. First, the door seal regulator valve 64 is opened until a desired door seal pressure is indicated on the door seal pressure gauge 68. Opening the door seal regulator valve 64 causes air from the compressor 72 to be delivered through the door seal inlet opening 96 of the aircraft 84 and into the interior of the door seal 94. The aircraft cabin pressurization test apparatus 20 is then operated to supply pressurized air to the aircraft cabin 86. The cabin vertical speed indicator 56 is observed to indicate the rate of pressure change of the aircraft cabin. The aircraft's maintenance manual should be checked to determine the cabin rate of change and pressure limitations. The rate of pressure change is controlled with the supply air pressure regulator valve 36. The supply air pressure is then slowly increased while the specified rate of pressure change is maintained until the aircraft cabin pressure gauge 54 indicates the preferred cabin test pressure (found in the aircraft maintenance manual). The supply air pressure regulator valve 36 is then slowly moved toward its closed position until the cabin vertical speed indicator 56 indicates zero rate of pressure change and the cabin pressure gauge 54 indicates that the aircraft cabin 86 is held at the preferred cabin test pressure. In an exemplary aircraft, the preferred cabin test pressure is at least 8.0 psig. At this point, the amount of air flow entering the aircraft cabin 86 is equal to the amount of air leaking from the cabin. In other words, the aircraft cabin 86 is in an equilibrium state. With the aircraft cabin 86 in the equilibrium state, the user records the pressure indicated by the supply air pressure gauge 34, the pressure indicated by the supply air flow gauge 40, and the temperature indicated by the delivery air temperature gauge 44. The user then uses the recorded information to convert the actual air flow data to the temperature corrected air flow.

With the aircraft cabin 86 maintained in the equilibrium state and with the aircraft cabin held at the preferred cabin test pressure, one or more users may listen to the exterior of the aircraft 84 to determine at least a general region from where the cabin's air is leaking. Additional detection methods (e.g., applying liquid soap to the general region to see if the air leakage causes the soap to bubble, or burning a cigarette or some other smoke generating element to see if the air leakage blows the smoke) may be employed to pinpoint the source of air leakage. To perform the listening procedure, the first region 80 of the ground site and the air compressor 72 are sufficiently remote from the aircraft such that noise from the air compressor does not interfere with the step of locating leaks.

In addition to detecting leaks when the user is outside the aircraft 84, it is often necessary for the user to be within the aircraft cabin to detect the leaks. Accordingly, it is desirable to keep the aircraft cabin from getting unbearably hot. The air from the compressor 72 is delivered through the aircraft cabin pressurization inlet opening 88 preferably at a temperature of less than 120° F. (49° C.), and more preferably at a temperature of less than 100° F. (38° C.), and even more preferably at a temperature of less than 80° F. (27° C.).

A pressure decay method is another method of detecting aircraft leakage rates after the equipment set-up procedure is performed. With the pressure decay method, the aircraft cabin pressurization test apparatus 20 is employed to first pressurize the aircraft cabin to the preferred cabin test pressure. Delivery of air into the aircraft cabin 86 is then preferably abruptly stopped. The user reads and records the cabin pressure gauge 54 at a plurality of time intervals after the stoppage of air delivery into the aircraft cabin 86 to determine air pressure in the aircraft cabin at each such time interval. The cabin pressure decay over time can be plotted on a pressure decay limit graph provided in the aircraft maintenance manual.

Thus, the aircraft cabin pressurization test apparatus 20 may be used to perform diagnostics on an aircraft cabin without suffering from the deficiencies of conventional aircraft cabin pressurization test units.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A method of using an aircraft pressurization test apparatus to perform diagnostic tests on an aircraft while the aircraft is at a first region of a ground site, such as an aircraft hanger, the ground site including shop air, the shop air comprising a compressor fixedly secured to a second region of the ground site, the shop air further comprising fluid lines and a plurality of air couplers at different locations of the ground site, the compressor and fluid lines being configured and adapted for delivery of pressurized air to the air couplers, the aircraft comprising an aircraft cabin and an aircraft cabin pressurization inlet opening in fluid communication with the aircraft cabin, the aircraft pressurization test apparatus comprising a shop air aperture and a delivery air aperture, the method comprising:

positioning the aircraft at the first region of the ground site;

using a first delivery line in a manner to enable fluid communication between the shop air aperture of the aircraft pressurization test apparatus and one of the air couplers of the shop air;

using a second delivery line in a manner to enable fluid communication between the aircraft cabin pressurization inlet opening and the delivery air aperture;

delivering air from the compressor of the shop air through the aircraft cabin pressurization inlet opening and into the aircraft cabin via the shop air aperture and the delivery air aperture of the aircraft pressurization test apparatus;

regulating the delivery of air from the compressor of the shop air through the aircraft cabin pressurization inlet opening by changing characteristics of the flow path between the shop air aperture and the delivery air aperture.

2. A method as set forth in claim 1 wherein the step of delivering air from the compressor to the aircraft cabin pressurization inlet opening comprises delivering air through the aircraft cabin pressurization inlet opening at a temperature of less than 120° F. (49° C.).

3. A method as set forth in claim 1 wherein the step of delivering air from the compressor to the aircraft cabin pressurization inlet opening comprises delivering air through the aircraft cabin pressurization inlet opening at a temperature of less than 100° F. (38° C.).

4. A method as set forth in claim 1 wherein the step of delivering air from the compressor to the aircraft cabin pressurization inlet opening comprises delivering air through the aircraft cabin pressurization inlet opening at a temperature of less than 80° F. (27° C.).

5. A method as set forth in claim 1 wherein the aircraft pressurization test apparatus further comprises a cabin feedback air aperture and a cabin pressure gauge in fluid communication with the cabin feedback air aperture, and wherein the method further comprises:

using a cabin feedback line in a manner to enable fluid communication between the aircraft cabin and the cabin feedback air aperture of the aircraft pressurization test apparatus;

using the cabin pressure gauge to gauge air pressure within the aircraft cabin.

6. A method as set forth in claim 5 wherein the aircraft pressurization test apparatus further comprises a cabin vertical speed indicator in fluid communication with the cabin feedback air aperture, the cabin vertical speed indicator being adapted and configured for indicating rate of change of pressure, the method further comprising:

using the cabin vertical speed indicator in a manner to indicate change of air pressure within the aircraft cabin.

7. A method as set forth in claim 6 wherein the aircraft pressurization test apparatus further comprises a delivery air flow gauge in communication with the delivery air aperture, the delivery air flow gauge being configured and adapted to gauge air flow through the delivery air aperture, wherein:

the step of delivering air from the compressor of the shop air through the aircraft cabin pressurization inlet opening and into the aircraft cabin comprises delivering air into the aircraft cabin sufficient to pressurize the aircraft cabin to a cabin test pressure, and wherein the method further comprises:

maintaining delivery of air from the compressor of the shop air and into the aircraft cabin at a rate such that the cabin vertical speed indicator indicates that cabin pressure is in equilibrium while and the cabin pressure gauge indicates that the cabin pressure is approximately equal to the cabin test pressure;

using the delivery air flow gauge to measure air flow into the aircraft cabin when the cabin vertical speed indicator indicates that the cabin pressure is in equilibrium and the cabin pressure gauge indicates that the cabin pressure is approximately equal to the cabin test pressure.

8. A method as set forth in claim 7 wherein the method further comprises:

using the measure of air flow into the aircraft cabin to determine the rate of air leakage from the aircraft cabin.

9. A method as set forth in claim 6 wherein the step of delivering air from the compressor of the shop air through the aircraft cabin pressurization inlet opening and into the aircraft cabin comprises delivering air into the aircraft cabin sufficient to pressurize the aircraft cabin to a cabin test pressure, and wherein the method further comprises:

stopping the delivery of air into the aircraft cabin; and reading the cabin pressure gauge at a plurality of time intervals after the stopping step to determine air pressure in the aircraft cabin at each such time interval.

10. A method as set forth in claim 6 wherein the aircraft pressurization test apparatus further comprises a delivery air flow gauge in communication with the delivery air aperture, the delivery air flow gauge being configured and adapted to gauge air flow through the delivery air aperture, wherein:

the step of delivering air from the compressor of the shop air through the aircraft cabin pressurization inlet opening and into the aircraft cabin comprises delivering air into the aircraft cabin sufficient to pressurize the aircraft cabin to a cabin test pressure;

the method further comprising listening to the exterior of the aircraft for leakage of air from the aircraft cabin to locate leaks; and the step of positioning the aircraft at the first region of the ground site comprises positioning the aircraft sufficiently remote from the air compressor such that noise from the air compressor does not interfere with the step of locating leaks.

11. A method as set forth in claim 1 wherein the aircraft pressurization test apparatus further comprises a cabin feedback air aperture and a cabin vertical speed indicator in fluid communication with the cabin feedback air aperture, and wherein the method further comprises:

using a cabin feedback line in a manner to enable fluid communication between the aircraft cabin and the cabin feedback air aperture of the aircraft pressurization test apparatus;

using the cabin vertical speed indicator in a manner to indicate change of air pressure within the aircraft cabin.

12. A method as set forth in claim 1 wherein the aircraft further comprises an aircraft door providing access to the aircraft cabin, a door seal adjacent the aircraft door and having an interior configured to be inflated, and a door seal inlet opening in fluid communication with the interior of the door seal, the aircraft pressurization test apparatus further comprises a door seal pressure output aperture, the method further comprising:

using a door seal pressure line in a manner to enable fluid communication between the door seal inlet opening of the aircraft and the door seal pressure output aperture of the aircraft pressurization test apparatus; and delivering air from the compressor of the shop air through the door seal inlet opening of the aircraft and into the interior of the door seal via the shop air aperture and the door seal pressure output aperture of the aircraft pressurization test apparatus.

13. A method of using an aircraft pressurization test apparatus to detect air leakage from a cabin of an aircraft, the aircraft comprising the aircraft cabin and an aircraft cabin pressurization inlet opening in fluid communication with the aircraft cabin, the aircraft pressurization test apparatus comprising a source air aperture and a delivery air aperture, the method comprising:

positioning the aircraft at a first region of a ground site, the ground site further including a second region with a source of pressurized air at the second region;

using a first delivery line in a manner to enable fluid communication between the source air aperture of the aircraft pressurization test apparatus and the source of pressurized air;

using a second delivery line in a manner to enable fluid communication between the aircraft cabin pressurization inlet opening and the delivery air aperture;

delivering air from the source of pressurized air through the aircraft cabin pressurization inlet opening and into the aircraft cabin via the source air aperture and the delivery air aperture of the aircraft pressurization test apparatus, the delivering of air being sufficient to pressurize the aircraft cabin to a cabin test pressure;

listening to the exterior of the aircraft for leakage of air from the aircraft cabin to locate leaks; and the step of positioning the aircraft at the first region of the ground site comprising positioning the aircraft sufficiently remote from the source of pressurized air such that noise from the source of pressurized air is insufficient to interfere with the step of locating leaks.

14. A method as set forth in claim 13 further comprising:

maintaining delivery of air from the source of pressurized air and into the aircraft cabin at a rate such that the cabin pressure is in equilibrium and approximately equal to the cabin test pressure during the step of locating leaks.

15. A method as set forth in claim 13 wherein the aircraft pressurization test apparatus further comprises a cabin feedback air aperture and a cabin pressure gauge in fluid communication with the cabin feedback air aperture, and wherein the method further comprises:

using a cabin feedback line in a manner to enable fluid communication between the aircraft cabin and the cabin feedback air aperture of the aircraft pressurization test apparatus;

using the cabin pressure gauge to gauge air pressure within the aircraft cabin.

16. A method as set forth in claim 15 wherein the aircraft pressurization test apparatus further comprises a cabin vertical speed indicator in fluid communication with the cabin feedback air aperture, the cabin vertical speed indicator being adapted and configured for indicating rate of change of pressure, the method further comprising:

using the cabin vertical speed indicator in a manner to indicate change of air pressure within the aircraft cabin.

17. A method as set forth in claim 13 wherein the step of delivering air from the source of pressurized air to the aircraft cabin pressurization inlet opening comprises delivering air through the aircraft cabin pressurization inlet opening at a temperature of less than 120° F. (49° C.).

18. A method of using an aircraft pressurization test apparatus to perform diagnostic tests on an aircraft while the aircraft is at a ground site, such as an aircraft hanger, the ground site including a source of pressurized air, the aircraft comprising an aircraft cabin and an aircraft cabin pressurization inlet opening in fluid communication with the aircraft cabin, the aircraft pressurization test apparatus comprising a source air aperture and a delivery air aperture, the method comprising:

positioning the aircraft at the ground site;

using a first delivery line in a manner to enable fluid communication between the source air aperture of the aircraft pressurization test apparatus and the source of pressurized air;

using a second delivery line in a manner to enable fluid communication between the aircraft cabin pressurization inlet opening and the delivery air aperture;

delivering air from the source of pressurized air through the aircraft cabin pressurization inlet opening and into the aircraft cabin via the source air aperture and the delivery air aperture of the aircraft pressurization test apparatus, the delivering of air being sufficient to pressurize the aircraft cabin to a cabin test pressure;

detecting leakage of air from the aircraft cabin;

maintaining delivery of air from the source of pressurized air and into the aircraft cabin at a temperature of less than 120° F. (49° C.) during the step of detecting leakage of air from the aircraft cabin.

19. A method as set forth in claim 18 wherein the step of maintaining delivery of air comprises maintaining delivery of air from the source of pressurized air and into the aircraft cabin at a temperature of less than 120° F. (49° C.) and at a flow rate such that the cabin pressure is in equilibrium and approximately equal to the cabin test pressure during the step of detecting leakage of air from the aircraft cabin.

20. A method as set forth in claim 18 wherein the step of maintaining delivery of air comprises maintaining delivery of air from the source of pressurized air and into the aircraft cabin at a temperature of less than 100° F. (38° C.) during the step of detecting leakage of air from the aircraft cabin.

21. A method as set forth in claim 18 wherein the step of maintaining delivery of air comprises maintaining delivery of air from the source of pressurized air and into the aircraft cabin at a temperature of less than 80° F. (27° C.) during the step of detecting leakage of air from the aircraft cabin.

22. An aircraft cabin pressurization test apparatus for performing diagnostic tests on an aircraft while the aircraft is at a first region of a ground site, such as an aircraft hanger, the aircraft comprising an aircraft cabin, the ground site including a source of pressurized air, the aircraft cabin pressurization test apparatus comprising:

a housing having an exterior surface;

a shop air coupler adjacent the exterior surface of the housing and configured and adapted to releasably receive a fluid line in fluid communication with the source of pressurized air of the ground site;

a delivery air coupler adjacent the exterior surface of the housing and configured and adapted to releasably receive a fluid line in fluid communication with an aircraft cabin pressurization inlet opening of the aircraft;

a supply air pathway defined between the shop air coupler and the delivery air coupler;

at least one valve in the supply air pathway for controlling flow of air from the shop air coupler through the delivery air coupler;

a supply air flow gauge adapted and configured for gauging air flow in the supply air pathway;

a supply air pressure gauge adapted and configured for gauging air pressure in the supply air pathway;

a cabin feedback air coupler adjacent the exterior surface of the housing and adapted and configured to releasably receive a fluid line in fluid communication with the aircraft cabin; and a cabin pressure gauge at least partially within the housing and in fluid communication with the cabin feedback air coupler, the cabin pressure gauge being adapted and configured to gauge air pressure in the aircraft cabin when the cabin feedback air coupler is in fluid communication with the aircraft cabin.

23. An aircraft cabin pressurization test apparatus as set forth in claim 22 wherein:

the at least one valve is at least partially within the housing;

the supply air flow gauge is at least partially within the housing; and the supply air pressure gauge is at least partially within the housing.

24. An aircraft cabin pressurization test apparatus as set forth in claim 22 further comprising a cabin vertical speed indicator in fluid communication with the cabin feedback air coupler, the cabin vertical speed indicator being adapted and configured for indicating rate of change of air pressure.

25. An aircraft cabin pressurization test apparatus as set forth in claim 22 wherein the cabin pressurization test apparatus is devoid of any mechanism for generating pressurized air.

26. An aircraft cabin pressurization test apparatus as set forth in claim 22 further comprising:

a door seal pressure output air coupler connected to the housing and adapted and configured to releasably receive a fluid line in fluid communication with a door seal of the aircraft;

a door seal air pathway defined between the shop air coupler and the door seal pressure output air coupler; and at least one door seal valve in the door seal air pathway for controlling flow of air from the shop air coupler through the door seal pressure output air coupler.

* * * * *